Dec. 4, 1962 E. C. McRAE 3,066,988
ANTI-SKID VEHICLE BRAKE CONTROL
Filed April 6, 1959 2 Sheets-Sheet 1

INVENTOR
Edwin C. McRae
BY

ATTORNEY

Dec. 4, 1962   E. C. McRAE   3,066,988
ANTI-SKID VEHICLE BRAKE CONTROL
Filed April 6, 1959   2 Sheets-Sheet 2
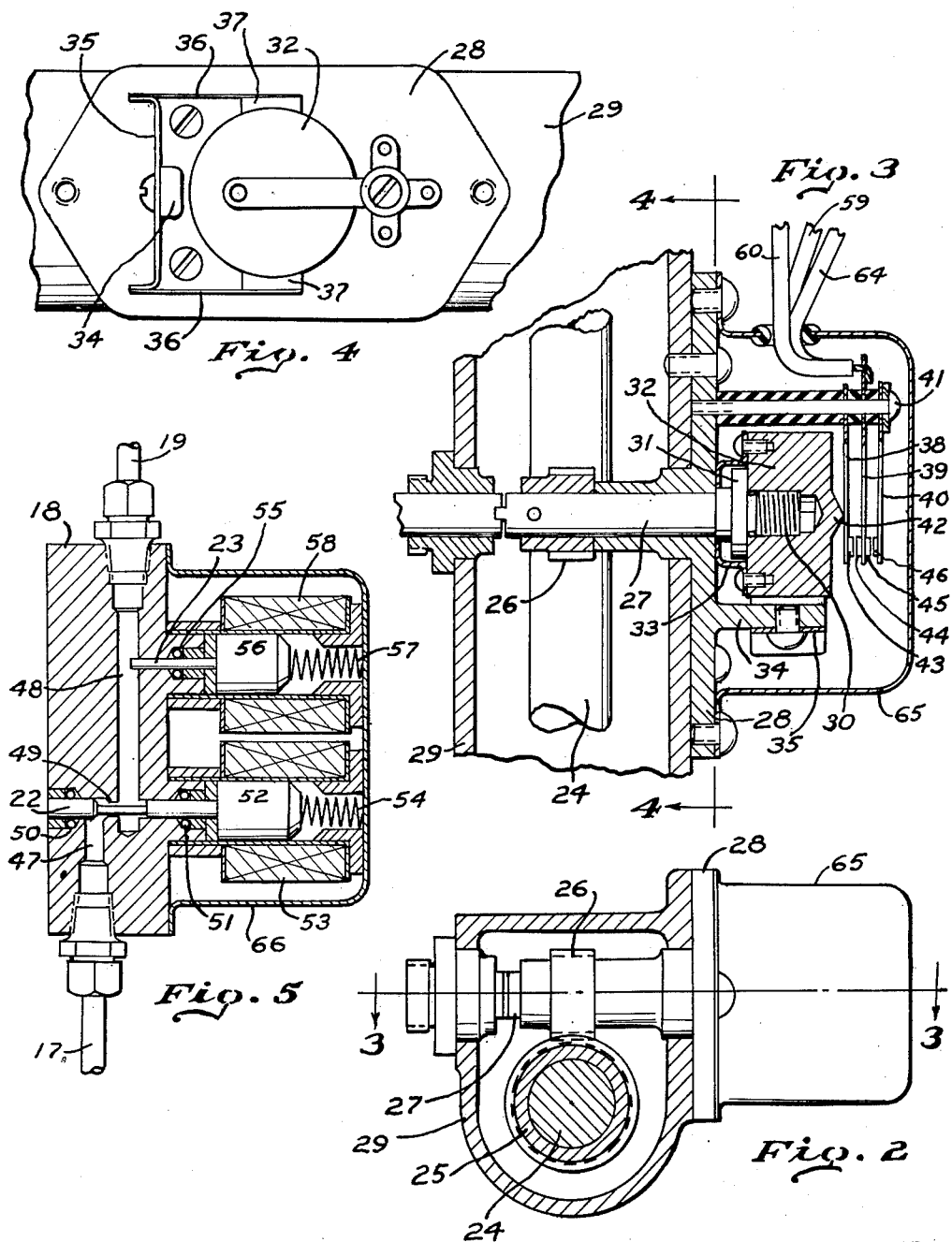
INVENTOR
Edwin C. McRae
BY
ATTORNEY

United States Patent Office 3,066,988
Patented Dec. 4, 1962

3,066,988
ANTI-SKID VEHICLE BRAKE CONTROL
Edwin C. McRae, 5216 NE. 18th Ave.,
Pompano Beach, Fla.
Filed Apr. 6, 1959, Ser. No. 804,365
10 Claims. (Cl. 303—69)

My invention relates to a brake system for motor vehicles or airplanes.

The particular feature which is the subject of this invention is the mechanism whereby the wheel brakes of the vehicle are permitted to develop maximum braking effort when the vehicle is being operated on a dry road surface while at the same time the wheels are prevented from skidding when the vehicle is operated on a slippery or wet road surface. It is well known that a vehicle brake designed to produce maximum braking effort on dry pavement will skid very easily when a slippery, icy or wet pavement is encountered. It is the object of this invention to provide a brake which will generate the maximum braking effort obtainable by the tires on any road surface while at the same time permitting the tires to roll on the surface regardless of the pressure applied by the brake pedal. Maximum braking effort between a tire and a road surface is obtained only as long as the tire continues to roll as the coefficient of friction between the road and the tire drops off instantly when the tire starts to skid.

It is also well known that the control of any vehicle is greatly improved when the wheels are permitted to keep on rolling as a skidding wheel loses its directional effect. My invention comprises the addition of a sensing unit and brake control unit to the conventional brake system. A separate sensing and control unit may be provided for each of the four wheels of the vehicle, but if this is not feasible, because of the added cost, then a single sensing unit and control unit may be provided for the rear wheel brakes only. The sensing unit may be operated through the axle differential.

Other objects and advantages of this invention will be made more apparent from the following description when considered in connection with the accompanying drawings wherein:

FIGURE 2 is a vertical sectional view taken through the torque tube of a vehicle showing a spiral gear drive for operating the sensing unit.

FIGURE 3 is a sectional view, taken on the line 3—3 of FIGURE 2.

FIGURE 4 is a sectional view, taken on the line 4—4 of FIGURE 3, and

FIGURE 5 is a central sectional view through the fluid control unit.

Figure 1:
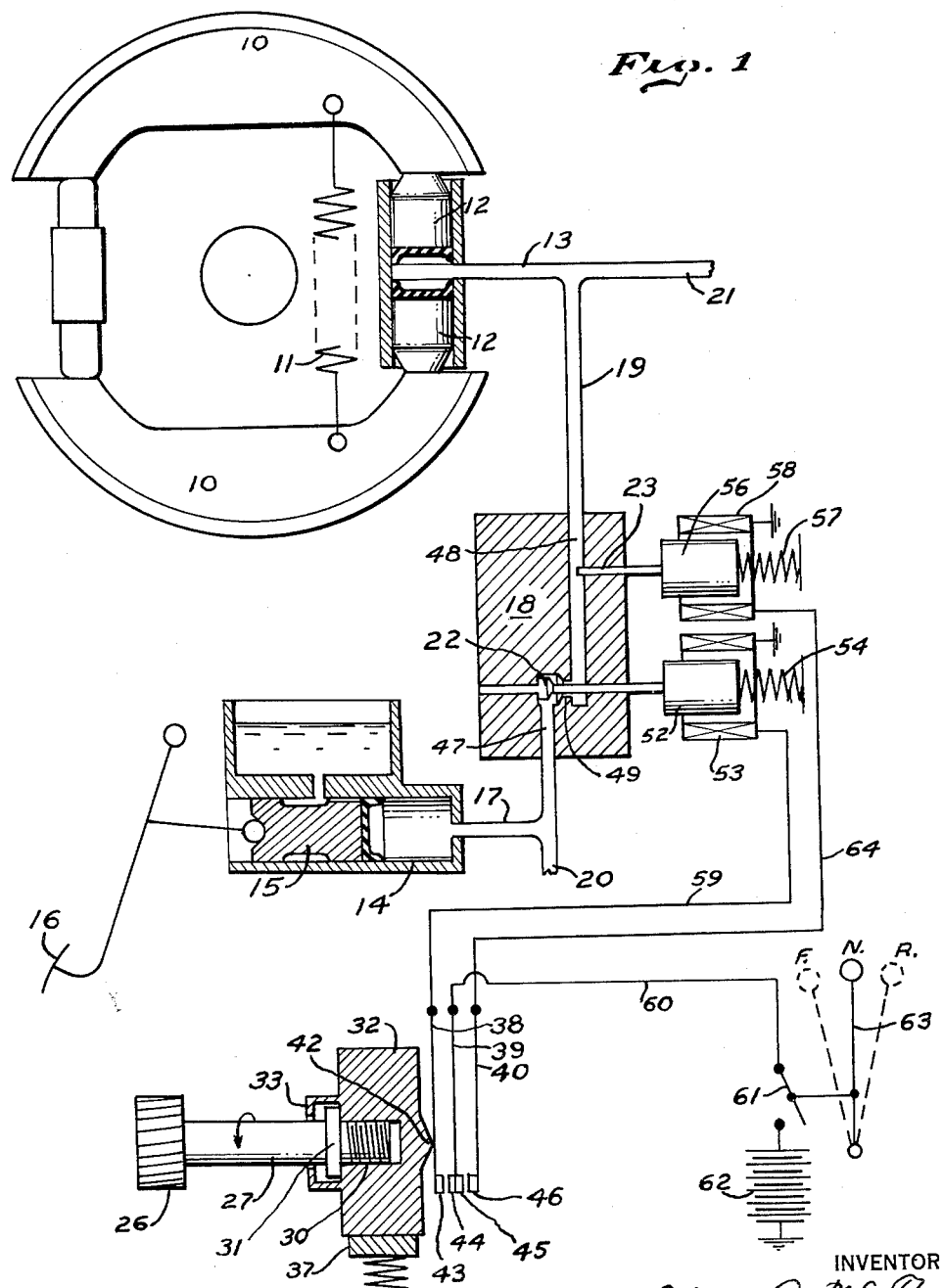
FIGURE 1 is a schematic hydraulic and electric diagram showing a conventional hydraulic wheel brake, a conventional master cylinder, a control unit for regulating the flow of fluid from the master cylinder to the wheel brake cylinder, and a sensing unit for actuating the control unit.

Referring to FIGURE 1 of the drawings, I have used the reference numeral 10 to indicate the two shoes of a conventional rear wheel brake. These shoes are mounted within a brake drum, not shown, which is fixed to one of the vehicle wheels. The shoes 10 are urged to their retracted positions by a spring 11 and are expanded into their engaged positions by wheel cylinder pistons 12. A fluid conduit 13 conducts fluid to the chamber between the pistons 12.

The aforementioned wheel brake has not been shown in detail as it is conventional and forms no part of this invention except as it co-operates with my control unit to form a complete brake system.

A conventional master cylinder 14 having a piston 15 therein which is actuated by brake pedal 16 is also shown but, like the wheel brake structure is not in itself new.

A conduit 17 extends from the master cylinder, just described, to a valve body 18. A conduit 19 extends from the valve body 18 to the conduit 13 so that fluid may be forced from the master cylinder 14 through conduit 17 into the valve body 18 and from there through the conduit 19 to the conduit 13 to thus actuate the wheel brake.

The structure shown in FIGURE 1 is designed to control only the two rear wheel brakes of the vehicle. To actuate the front wheel brakes, a conduit 20 extends from the conduit 17 to the two front wheel brakes. In the application shown, the front wheel brakes are not controlled by my invention but it will be apparent that a separate control can be provided for either or both of the front wheel brakes.

I have also shown only one rear wheel brake. A conduit 21 extends from the conduit 19 to the other rear brake so that fluid under pressure in the conduit 19 will flow equally to both of the rear wheel brakes.

Two solenoid actuated valves are associated with the valve body 18. One of these valves, numbered 22, when energized closes the passageway between conduits 17 and 19. The other solenoid actuated member is not in the true sense a valve but functions to partially relieve the pressure of the brake fluid which is trapped between the valve 22 and the rear wheel cylinders.

In the normal action of the brake system neither of these valves are energized so that full fluid pressure from the master cylinder is applied to the wheel cylinders. It is only when the wheels are decelerated faster than the rate of deceleration obtainable under optimum braking conditions that the valve 22 is closed to shut off the further flow of fluid to the rear wheel cylinders.

After this occurs the wheels may still be decelerating at a faster rate than obtainable with optimum braking. The plunger 23 is then energized to slightly enlarge the space in which the fluid is trapped between the rear wheel cylinders and the valve 22. Inasmuch as hydraulic brake fluid is practically incompressible a slight enlargement of the space in which it is confined will greatly reduce the pressure within the wheel cylinder. This will greatly reduce the pressure so that the wheel will again start to roll on the road surface.

Referring to the drawings, FIGURES 2, 3 and 4 show in detail the sensing unit which governs the control valve 18. Referring to these figures, reference numeral 24 designates a vehicle drive shaft having a spiral worm 25 fixed thereon. The worm 25 meshes with a spiral gear 26 fixed on a cross shaft 27. The shaft 27 is rotatably mounted in a base plate 28 of the sensing unit. The base plate 28 is fastened to a torque tube or housing 29 in which the drive shaft is mounted. In those vehicles which have exposed drive shafts the sensing unit may be mounted on the transmission as it is only necessary that the sensing unit be driven in synchronism with the wheels which it is designed to control.

The shaft 27 extends outwardly thru the plate 28 and terminates in a screw threaded end portion 30. A flange 31 is formed between the screw threaded end and the rest of the shaft 27. A cylindrical inertial member 32 is threaded on the end 30 and a collar 33 is fastened to the member 32 which prevents the member 32 from being unscrewed entirely from the shaft. However, sufficient clearance is provided between the collar 33 and the flange 31 so that the inertial member may be unscrewed axially a sufficient distance to actuate a series of contacts which will later be described.

Referring to FIGURES 3 and 4 an anchor 34 projects outwardly from the plate 28 and an arm 35 is fixed thereto in the plane of the inertial member 32. Leaf springs 36 are fastened to the respective ends of the arm 35 which support a pair of friction blocks 37. These blocks bear against the periphery of the member 32. The pressure exerted by the springs 36 may be adjusted by bending the ends of the arm 35. This pressure is adjusted so that the blocks 37 will slow down or stop the inertial member in substantially the same time as the shaft 27 slows down or stops when the vehicle brakes are applied under optimum braking conditions. This will be termed the safe braking rate. In other words if, from a speed of 40 miles per hour, it takes 5 seconds to bring the vehicle to a stop on dry pavement, then the blocks 37 should be adjusted to bring the inertial member to a stop from this speed in 5 seconds. Thus, when the vehicle, under optimum braking conditions, retards the shaft 27 at its maximum safe rate, the inertial member will be retarded by the blocks 37 at the same rate so that there will be no relative movement of the member 32 on the shaft 27. If, however, the wheels start to skid the shaft 27 will be retarded at a faster rate and will unscrew itself from the member. This will cause the inertial member to move axially outwardly. It should be kept in mind that it is not necessary to actually skid the wheels and bring the shaft 27 to a stop in order to cause outward movement of the inertial member but is only necessary to retard the shaft a higher than that obtainable under optimum braking conditions.

From the foregoing it will be seen that the instant the wheel being controlled starts to slip the inertial member will move axially and will stay in this outward position until the shaft 27 rotates at a faster rate than the speed of rotation of the inertial member. This outward movement of the inertial member is utilized to control the flow of braking fluid to the wheel brakes and to relieve the fluid braking pressure within the wheel cylinder, regardless of the pressure being developed in the master cylinder.

Referring to FIGURE 3, I have provided three leaf springs 38, 39 and 40, respectively, which are held in place by a screw 41 on the plate 28. The spring 38 is urged against an axial projection 42 on the member 32. The springs 38, 39 and 40 are insulated from each other and from the screw 41. A pair of contact points 43 and 44 are mounted on the springs 38 and 39 and are so positioned that they are open when the member 32 is moved inwardly on the screw threads 30. Likewise, a second pair of contact points 45 and 46 are mounted on the springs 39 and 40, respectively, so as to be normally open. An initial axial outward movement of the member 32 closes the points 43 and 44 and further axial movement then closes the points 45 and 46.

Referring to FIGURE 5 of the drawings, the brake control unit will now be described. The valve body 18 is provided with a bore 47 into which the conduit 17 is fastened. A second bore 48 is provided in the body 18 laterally spaced from the bore 47. The bore 48 is connected to conduit 19. A valve port 49 connects bores 47 and 48. Valve 22 is reciprocally mounted within the port 49 and extends outwardly thru the body 18. The valve 22 is a balanced valve and is sealed by a pair of O rings 50 and 51. A solenoid armature 52 is secured to the outer end of valve 22 and is actuated by a field winding 53. A spring 54 urges the armature 52 and valve 22 to its open position. When the winding 53 is energized the armature is moved against the force of spring 54 to close the valve 22 upon the port 49.

The member 23 comprises a plunger, numbered 23, reciprocally mounted in the body 18 so that its inner end extends into the bore 48. An O ring 55 seals the outer end of the plunger 23 which is connected to an armature 56. The plunger 23 is only about one eighth of an inch in diameter and a spring 57 urges the armature and plunger inwardly even against the maximum hydraulic pressure permitted within the bore 48. A solenoid field winding 53 is mounted around armature 56 which, when energized, moves the armature and plunger outwardly against the force of the spring 57. It will be noted from FIGURE 1 that one end of windings 53 is grounded and that the other end is connected by a wire 59 with leaf spring 38. The leaf spring 39 is connected by a wire 60 with the vehicle battery 62. The switch 61 is actuated by the vehicle transmission control lever 63 so that it is closed only when the control lever is in its forward driving position. Wire 64 connects winding 53 with the leaf spring 40.

A sheet metal cover 65 is detachably secured to the plate 28 to protect the sensing unit and another cover 66 is secured to the body 18 to protect the solenoid.

From the foregoing it will be seen that when the brake pedal 16 is depressed brake fluid will be forced into conduit 17, bore 47 thru port 49, into bore 48 and to the wheel cylinder by way of conduits 19 and 13. This will expand the brake shoes 10 to cause the vehicle to slow down. If the vehicle is being operated on dry pavement it will decelerate but a a rate slow enough that the inertial member 32 will not overrun the shaft 27. Consequently, under this condition neither the sensing unit nor the brake control units will function. However, if the vehicle is being operated on a slippery road surface the application of the brake may cause the tires to start to slip. This will instantly decelerate the shaft 27 at a higher than safe rate which will cause the inertial member to unscrew itself outwardly on the threads 30. This will close the contacts 43 and 44 to energize the winding 53 thereby closing the valve 22 against any further fluid pressure from the master cylinder. However, if the pressure within the wheel cylinder is sufficient to cause the tire to slip it must be relieved if the wheel is to be permitted to roll. The slipping will thus continue until the inertial member closes the contacts 45 and 46. This energizes the winding 58 which moves plunger 23 outwardly thus increasing the space wherein the wheel cylinder oil is trapped. A plunger only three thirty-seconds of an inch in diameter moving thru a three-eighth inch stroke will relieve the brake shoes .005 inch will reduce the braking effort to only a fraction of its formerly applied pressure. Thus, the associated wheel will be permitted to accelerate to full ground speed. During this interval the inertial member has decelerated so that the shaft 27 now is rotating faster than the inertial member. This causes the member 32 to be screwed back to its inoperative position and thus de-energizing both solenoids.

The just described cycle of events is then repeated. In fact the entire cycle takes only a small fraction of a second and is repeated hundreds of times to bring the vehicle to a safe stop on slippery road surface. It should be kept in mind that the vehicle wheels do not have to stop to actuate the control but need only decelerate at a faster than safe rate to cause the sensing unit to function. Thus the wheel continues to roll and maintains its directional rolling effect.

It will be understood that the invention is not to be limited to the exact construction shown and described, but that various changes and modifications may be made without departing from the spirit and scope of the invention, as defined in the appended claims.

What is claimed is:

1. In a vehicle brake system, a brake associated with one of the wheels of said vehicle, means for applying a braking force to said brake, a driving member driven in synchronism with said vehicle wheel, an inertial member rotated in one direction by said driving member thru a helical cam surface, said cam surface permitting said inertial member to overrun said driving member in the direction in which it is driven by moving axially thereon, means applying a retarding force to said inertial member sufficient to decelerate said inertial member from any given speed at substantially the same rate as the full safe application of said brake under optimum braking conditions decelerate said driving member, and means actuated by said axial movement of said inertial member when said driving member decelerates at faster than optimum rate which resists the application of said braking force to said brake.

2. A device, as claimed in claim 1, wherein said means actuated by said axial movement of said inertial member first resists the application of said brake applying force to said brake and then reduces the amount of said brake applying force to said brake.

3. A device, as claimed in claim 1, wherein said helical cam surface comprises a screw thread formed on said driving member and a mating screw thread formed in said inertial member.

4. A device, as claimed in claim 1, wherein said means actuated by axial movement of said inertial member comprises a solenoid actuated valve for controlling the application of the braking force to said brake.

5. In a vehicle brake system, a brake arranged to operatively retard one of the wheels of said vehicle, means for applying a brake actuating force to said brake, a driving member rotated in synchronism with said vehicle wheel, an inertial member rotated in one direction by said driving member and being free to overrun said driving member in the direction in which it is driven thereby, a friction brake for applying a retarding force to said inertial member sufficient to decelerate said inertial member from any given speed at substantially the same rate as the full safe application of the vehicle brakes at the same speed and under optimum braking conditions decelerates said driving member, said means for applying a retarding force to said inertial member comprising a spring urged brake which frictionally engages the periphery of said inertial member, and means actuated by said overrunning movement of said inertial member when said driving member decelerates at a faster than optimum rate which resists the application of said brake applying force to said brake.

6. In a vehicle brake system, a hydraulically actuated brake arranged to operatively retard one of the wheels of said vehicle, a master cylinder connected to said brake which normally supplies fluid under pressure to actuate said brake, a driving shaft connected thru gearing to said vehicle wheel, an inertial member rotated in one direction by said shaft and being free to overrun said shaft in the direction in which it is driven, means for applying a retarding force to said inertial member sufficient to decelerate said member from any given speed at substantially the same rate as the full safe application of the vehicle brake at the same speed decelerates said driving shaft, a pair of normally open contact points arranged to be closed by the overrunning movement of said inertial member, said overrunning movement of said inertial member moving said inertial member axially relative to said driving shaft to close said contact points, and a solenoid operated valve inserted in the connection between said master cylinder and said wheel brake, said solenoid being actuated to close said valve by the closing of said contact points.

7. A device, as claimed in claim 6, wherein said means for applying a retarding force to said inertial member comprises a pair of spring urged friction blocks operating against the periphery of said inertial member.

8. In a device, as claimed in claim 6, wherein said means for applying a retarding force comprises a spring urged friction member which engages the periphery of said inertial member.

9. In a vehicle having a pair of rear wheels driven from a common drive shaft thru a differential, a brake for each of said rear wheels, a common means for applying a brake actuating force to both of said brakes, a driving member rotated in synchronism with said drive shaft, an inertial member rotated in one direction by said driving member and being free to overrun said driving member in the direction in which it is being rotated, means for applying a retarding force to said inertial member sufficient to decelerate said inertial member from any given speed at substantially the same rate as the maximum application of the vehicle brakes without skidding and at the same speed and under optimum braking conditions decelerates said driving member, and means actuated by axial movement of said inertial member which prevents the application of the rear wheel brakes.

10. A device, as claimed in claim 9, wherein said means actuated by said axial movement not only prevents the application of the brake applying force to the rear wheel brakes but also reduces the amount of such force as has already been applied to said wheels.

References Cited in the file of this patent

UNITED STATES PATENTS

| | | |
|---|---|---|
| 2,107,823 | Hallot | Feb. 8, 1938 |
| 2,159,778 | Bush | May 23, 1939 |
| 2,184,568 | Stauffer | Dec. 26, 1939 |
| 2,225,315 | McCollum | Dec. 17, 1940 |
| 2,294,602 | Hines | Sept. 1, 1942 |

FOREIGN PATENTS

| | | |
|---|---|---|
| 382,241 | Great Britain | Oct. 20, 1932 |